United States Patent Office 3,005,140
Patented Oct. 17, 1961

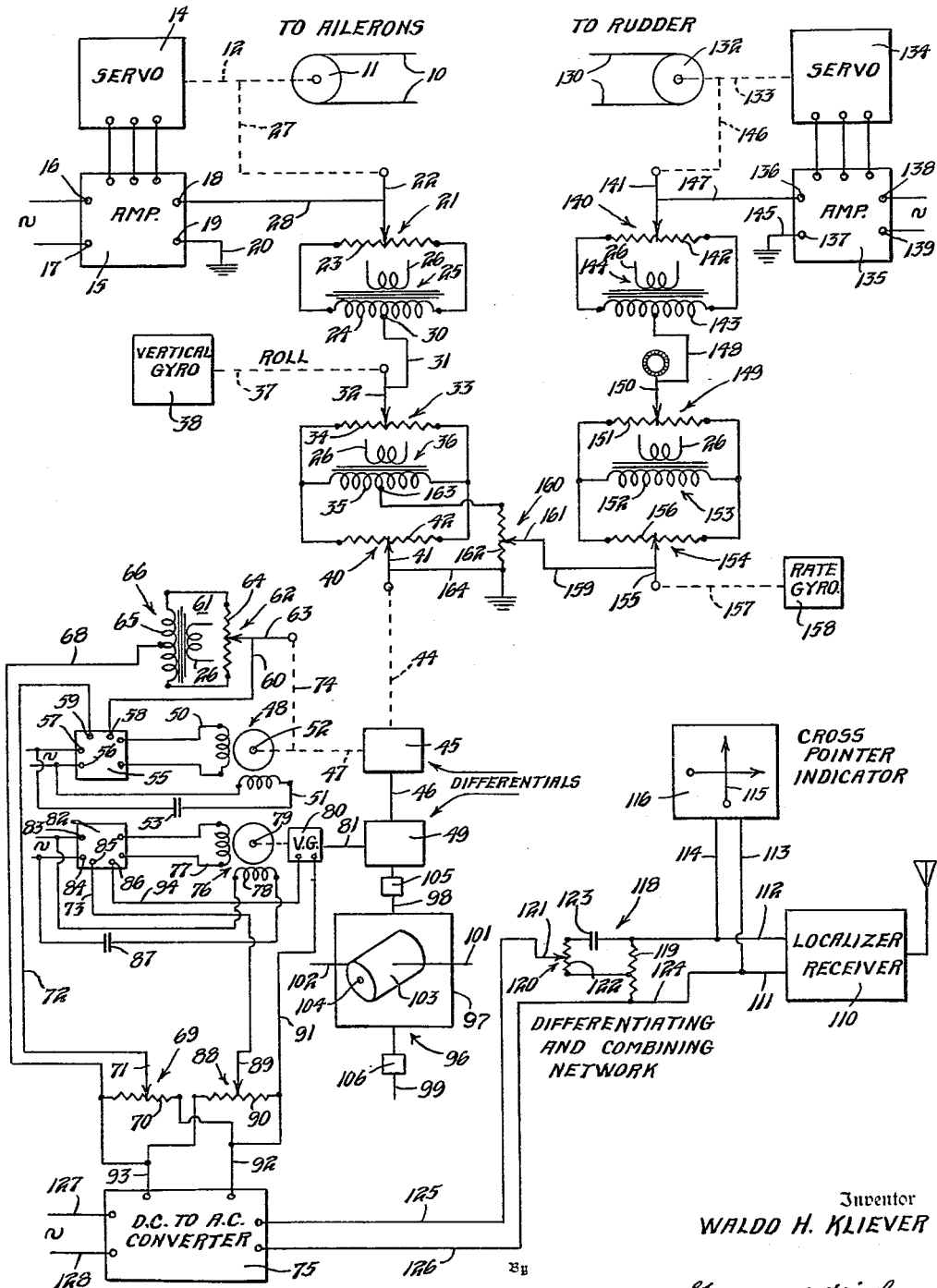

3,005,140
RADIO CONTROLLED AUTOMATIC PILOTS
Waldo H. Kliever, Minneapolis, Minn., assignor to Minneapolis-Honeywell Regulator Company, Minneapolis, Minn., a corporation of Delaware
Filed May 3, 1948, Ser. No. 24,869
23 Claims. (Cl. 318—489)

This invention pertains to automatic steering mechanisms for dirigible craft. More particularly, this invention concerns automatic steering mechanisms for aircraft which may be controlled by signals received from remote radio transmitting stations. Such stations may be located in proximity to an airfield where the aircraft in flight are to land.

The landing of aircraft at an airfield while visibility surrounding said field is obscured is facilitated by the use of radio signals. Radio signals being emitted from a transmitter located at the field provide two patterns in known manner which form a "localizer" plane which serves as a directional guide to the airfield.

An automatic steering mechanism may be operated in accordance with a function of the angle between a vertical plane defined by the transmitter and the aircraft and the localizer plane to cause the aircraft to follow the localizer plane or localizer beam. Such steering mechanisms may include a directional gyroscope which stabilizes the aircraft on the beam once it has reached this position whereby changes in heading of the aircraft while on the beam are immediately corrected before the aircraft departs from the beam.

One form of steering mechanism includes a slow rotating variable rate motor controlled by the magnitude of the localizer signal obtained from a localizer receiver which signal varies with the function of the angular distance of the aircraft from the beam. This motor in turn initiates operation of the steering mechanism to bring the aircraft around toward the beam. After the turn is initiated by the variable rate motor, the motor continues to rotate at a rate which varies in accordance with the changing value of the localizer signal; and its rotation is utilized to counteract the tendency of the directional gyro to oppose changes in heading.

However, when the steering mechanism is controlled solely by the variable rate motor in order to bring the craft on the localizer beam, this motor has to initially rotate a sufficient distance to set up the commensurate rate of turn in the steering mechanism before the craft alters its heading. This initial rotation introduces an undesirable time lag in the response of the aircraft to the localizer signal.

It is therefore an object of my invention to control a steering mechanism of an aircraft from a control signal so that time lag in response of the aircraft to said signal is reduced.

A further object of my invention is to control an automatic steering mechanism for a dirigible craft from a localizer receiver responsive to radio signals so that the response of said aircraft to said signals from a time aspect is reduced.

A further object of my invention is to control an automatic steering mechanism of a dirigible craft from a radio signal so that a rate of turn proportional to the magnitude of a function of said signal is immediately applied through a part of said mechanism to said craft and thereafter a stabilized rate of turn proportional to said signal is maintained through another part of said mechanism.

A further object of my invention is to control said steering mechanism of an aircraft differentially in accordance with the magnitude of a radio signal, the duration and magnitude of said signal, and the change in attitude of said craft about an axis.

These and further objects of my invention will appear from a consideration of the following description and drawing illustrating a preferred embodiment thereof.

The sole figure constituting the drawings is a diagrammatic arrangement of the parts of my improved automatic steering mechanism.

The drawing illustrates an aileron and rudder section of an automatic steering mechanism whereby the aircraft is controlled about the roll and yaw axes.

Briefly, the ailerons, not shown, are operated from cables 10 extending from a cable drum 11 which is driven by an aileron servomotor 14. The servomotor 14 is controlled by an aileron servomotor amplifier 15.

The amplifier 15 is provided with a balanceable signal input circuit which includes a rebalancing potentiometer 21, a banking potentiometer 33, and a localizer and directional gyro potentiometer 40. The balanceable electrical network is controlled by a group of series connected electrical signal generators comprising a follow up connection 27 from servomotor 14, a vertical gyro 38, and a first differential 45. The first differential 45 is operated by a displacement motor 48 and the output of a second differential 49. The second differential is operated by a directional gyro 96 and by a variable rate motor 76. The displacement motor 48 and the variable rate motor 76 are provided with amplifiers 55, 82 respectively.

A control signal for the displacement motor amplifier 55 and the variable rate motor amplifier 82 is obtained from voltage dividers 69, 88 connected in parallel across the output of a D.C. to A.C converter 75. The D.C. to A.C. converter is supplied with a control signal derived from a differentiating and combining network 118. The differentiating and combining network is controlled by signals obtained from a radio responsive localizer receiver 110. The localizer receiver is operated in response to radio signals emitted by a localizer transmitter, not shown, in proportion to a function of the angular distance of the aircraft upon which the localizer receiver is mounted from the localizer beam. A cross pointer indicator 116 is connected across the output of the localizer receiver to indicate a function of the angular distance of the aircraft from the localizer beam.

The rudder, not shown, of the aircraft is operated by cables 130 extending from a cable drum 132 which is operated by a rudder servomotor 134. The servomotor is controlled by a rudder servomotor amplifier 135 which has a balanceable electrical signal input circuit. The balanceable electrical input circuit comprises a group of series connected signal generators comprising a follow up potentiometer 140, a trimmer potentiometer 149, a rate gyro operated potentiometer 154, and a voltage dividing potentiometer 160 connected across the output of the localizer-directional gyro potentiometer 40.

Following this brief description, the details of the apparatus will be considered. The aileron cable drum 11 is carried by a shaft 12 extending from servomotor 14. The servomotor 14 is connected by suitable leads to the output terminals of amplifier 15. The amplifier 15 is provided with terminals 16, 17 which are connected to a source of alternating voltage which may be the ship's supply. The amplifier 15 is provided with signal input terminals 18 and 19. The direction of rotation of servomotor 14 is dependent upon the phase relationship between the voltage across terminals 16 and 17 connected to the supply and the voltage across the signal input terminals 18 and 19. The servomotor amplifier combination may be of the type disclosed in United States Patent 2,425,733, dated August 19, 1947.

Terminal 19 of amplifier 15 is connected by means of lead 20 to ground. The other signal input terminal 18 of amplifier 15 is connected by lead 28 to adjustable wiper 22 of the follow up potentiometer 21. The wiper 22 is operated by a follow up connection 27 from servomotor 14. The follow up potentiometer 21 includes a resistor 23 which is connected across the ends of a secondary winding 24 of a transformer 25 having a primary 26.

A lead 31 extends from a center tap 30 of secondary winding 24 to the adjustable wiper 32 of the vertical gyro bank potentiometer 33. The wiper 32 of potentiometer 33 is operated through a connection 37 by a vertical gyro 38. The vertical gyro 38 is of a conventional type having its rotor mounted for rotation about a vertical axis. The vertical gyro 38 may be similar to the vertical gyro K in FIGURE 1 of Patent 2,190,390. The vertical gyro 38 is so arranged in the aircraft that upon movement of the craft about the roll axis, movement is transmitted through the connection 37 to the wiper 32. The potentiometer 33 has a resistor 34 which is connected across the ends of a secondary winding 35 of a transformer 36. Since the various potentiometer transformer secondary windings may have a common primary winding, the primary winding of transformer 36 is indicated as 26 corresponding to the same primary winding of transformer 25.

The localizer-directional gyro potentiometer 40 has a resistor 42 which is connected across the ends of secondary winding 35 in parallel with resistor 34 of the bank potentiometer 33. A wiper 41 of potentiometer 40 is positioned along the surface of resistor 42 by an operative connection 44 extending from the third arm or output arm of the differential 45. The differential 45 may be of the conventional type and therefore in addition to the third or output arm it is provided also with two input arms. A first input arm of differential 45 is driven by an output shaft 46 extending from a second differential 49. The second input arm of differential 45 is driven by a shaft 47 of the displacement motor 48.

The displacement motor 48 may be a conventional capacitor type induction motor having windings 50, 51 which provide a rotating field and an armature 52 inductively associated with the rotating field. Winding 51 of motor 48 is connected across the ship's supply in series with a capacitor 53. Winding 50 of motor 48 is connected across the output terminals of an amplifier 55. The amplifier 55 has power input terminals 57, 56 which are connected to the ship's supply. The amplifier 55 also has signal input terminals 58 and 59. The direction of rotation of the displacement motor 48 depends upon the phase relationship between the signal voltage across input terminals 58 and 59 of amplifier 55 and the voltage across the winding 51 of motor 48. The signal input terminals 58, 59 of amplifier 55 are connected to a control circuit comprising lead 60, a variable impedance network 61, lead 68, a first localizer voltage dividing potentiometer 69, lead 72, to terminal 59 of amplifier 55.

The variable impedance network 61 comprises a follow up potentiometer 62 and a transformer 66. The potentiometer 62 has a resistor 64 which is connected across the ends of a secondary winding 65 of transformer 66. Potentiometer 62 has an adjustable wiper 63 which is operated by means of a follow up connection 74 extending from the shaft 47 of motor 48. Transformer 66 is provided with a primary winding 26. Lead 60 extends from terminal 58 to the wiper 63 of potentiometer 62. Potentiometer 69 comprises a resistor 70 and an adjustable tap 71. Resistor 70 is connected across the output member 92, 93 of a converter 75. Lead 68 extends from a center tap of secondary winding 65 of transformer 66 to one end of resistor 70. Lead 72 extends from the adjustable tap 71 to terminal 59 of amplifier 55.

The first input arm of differential 45 is driven as stated by shaft 46 extending from differential 49. The second differential 49 may be a conventional type having three arms. The output or third arm of differential 49 is connected to shaft 46. A first arm of differential 49 is operated from the shaft 81 of the variable rate induction motor 76. The variable rate motor consists of an amplifier winding 77 and a line winding 78 which coact to generate a rotating field. Coacting with this field in inductive relation thereto is an armature 79. The motor 76 operates a velocity generator 80 through its drive shaft 81. The variable rate motor 76 may be of the type disclosed in United States Patent of John F. Schoeppel et al., No. 2,524,998, issuing from an application filed March 18, 1944. Winding 78 is connected in series with a capacitor 87 across the ship's supply. Winding 77 is connected across the output terminals of an amplifier 82. Amplifier 82 is provided with power input terminals 83, 84 which are connected to the ship's supply. The amplifier 82 has signal input terminals 85, 86. Signal input terminals 85 and 86 are connected to a control circuit extending from terminal 85, lead 73, potentiometer 88, lead 91, velocity generator 80, lead 94, to terminal 86 of amplifier 82. Potentiometer 88 comprises an adjustable tap 89 and a resistor 90 which is connected across the output members 92, 93 of converter 75. Lead 73 extends from terminal 85 of amplifier 82 to the adjustable tap 89. Lead 91 extends from one end of resistor 90 to a terminal of velocity generator 80. Lead 94 extends from the other terminal of velocity generator 80 to signal input terminal 86 of amplifier 82. The velocity generator 80 generates a signal which is placed in series with the voltage between adjustable tap 89 and lead 91 in the input control circuit of amplifier 82 and tends to maintain the speed of motor 76 proportional to the voltage between the adjustable tap 89 and the lead 91 by supplying an opposing voltage equal to the incoming signal whenever the speed starts to exceed a value proportional to the signal.

The second arm of differential 49 is driven by the directional gyro 96. Directional gyro 96 may be of a conventional type having an outer vertical gimbal ring 97 whose trunnions 98 and 99 are carried by suitable bearings 105, 106. Coacting with ring 97 is a rotor casing 103 having horizontal trunnions 101, 102 which are suitably journaled in the outer gimbal ring 97. The casing 103 houses a gyro rotor, not shown, which rotates about a horizontal axis 104. The upper trunnion 98 of gimbal ring 97 is adapted to operate the second arm of differential 49.

Passing now to the radio signal responsive device, the localizer receiver 110 is of the type which provides a signal which is a function of the angular distance of the aircraft from a localizer beam forming a part of an instrument landing system. A suitable type of system and localizer receiver is disclosed in a publication issued by the Civil Aeronautics Administration of the United States Department of Commerce titled "Technical Development Report No. 35 Instrument Landing System," part 1, Henry I. Metz, dated October 1943. The receiver to which reference is made in the above publication is illustrated in Figure 60, on page 53.

The localizer receiver provides a signal which is proportional to the angle subtended between the localizer beam and a vertical plane containing a line extending from the localizer transmitter to the aircraft. This angle is distinct from the angle of deviation sensed by the directional gyro upon deviation of the craft from the desired heading. In other words, the localizer provides a signal proportional to the angle which the aircraft must traverse in a horizontal plane in order to reach the localizer beam. A cross pointer indicator 116 has a localizer pointer 115 which is operated by leads 113 and 114 connected across the output leads 111, 112 of the receiver 110. The output of the localizer receiver 110 is also applied to the differentiating and combining network 118.

The network 118 includes a voltage dividing resistor 119 which is connected across the output leads 111 and 112 of the localizer receiver 110. A potentiometer 120 has a resistor 122 which has one end connected to the center of resistor 119 and has its other end connected through a capacitor 123 to the other end of resistor 119. A tap 121 may be manually adjusted over the resistor 120. Due to the fact that the condenser 123 prevents any but variations in the output of the localizer receiver from being impressed across resistor 122 while the output is applied directly across resistor 119, the voltage between adjustable tap 121 and point 124 of resistor 119 is proportional to the signal obtained from the localizer receiver and also the rate of change in the localizer receiver signal. In other words, the voltage across tap 121 and terminal 124 is proportional to the angular distance of the craft from the localizer plane and also to the rate of change of the angular distance of the craft from the localizer plane. A lead 125 extends from the adjustable tap 121 to one input of converter 75 and a lead 126 extends from terminal 124 to the other input of converter 75. A D.C. signal voltage proportional to the angular displacement plus the rate of change of angular displacement is thus applied to the converter 75.

The converter 75 converts the D.C. signal input supplied across leads 125 and 126 to an A.C. signal voltage applied across the output connections 76 and 77 of converter 75. The converter 75 may be of the type disclosed in United States Patent 2,423,524. The converter 75 is supplied with input leads 127, 128 which are connected to the ship's supply for obtaining an output signal across leads 92 and 93 which is of the same frequency as the supply line. It is thus evident that the A.C. voltage across leads 92 and 93 has a displacement component and a rate of change of displacement component.

Reverting to the rudder control section of the automatic steering mechanism, the rudder cable drum 132 is carried by a shaft 133 extending from the rudder servomotor 134. The servomotor 134 is operatively controlled by an amplifier 135. The amplifier 135 is provided with control signal input terminals 136, 137 and input terminals 138, 139, the latter being connected to the ship's supply. Terminal 137 of amplifier 135 is connected by lead 145 to ground. A lead 147 extends from signal input terminal 136 of amplifier 135 to an adjustable wiper 141 of the follow up potentiometer 140. The wiper 141 is operated by a follow up connection 146 extending from the servomotor shaft 133. The follow up potentiometer 140 includes a resistor 142 which is connecter across the ends of a secondary winding 143 of a transformer 144. The transformer 144 has a primary winding 26.

A lead 148 extends from a center tap of secondary winding 143 to an adjustable wiper 150 of the centering potentiometer 149. The wiper 150 is manually operated. The potentiometer 149 has a resistor 151 which is connected across the ends of a secondary winding 152 of a transformer 153 having a primary winding 26. While not illustrated, a centering potentiometer may also be provided in the aileron amplifier circuit.

The rate gyro potentiometer 154 has a resistor 156 which is connected to the ends of secondary winding 152 in parallel with resistor 151 of the centering potentiometer. Potentiometer 154 includes a wiper 155 which is operated through a connection 157 by a rate gyro 158. The rate gyro 158 may be of a conventional spring restrained type having a rotor mounted for rotation about a horizontal axis and which rotor precesses about a second horizontal axis at right angles to the axis of rotation upon the movement of the aircraft about the vertical or yaw axis.

The potentiometer 160 comprises an adjustable tap 161 and a resistor 162. One end of resistor 162 is connected to a center tap 163 of secondary winding 35 of transformer 36; the opposite end of resistor 162 is connected by a lead 164 to wiper 41 of the potentiometer 40. This same end of resistor 162 is also connected to ground. A lead extends from the wiper 155 of the rate gyro potentiometer 154 to the manually adjustable tap 161 of potentiometer 160.

*Operation*

Having described the components and their association in my novel steering mechanism, the operation of this mechanism will now be considered.

As a preliminary condition, it is assumed that the aircraft is in level flight attitude and is flying on a selected heading. At this time, therefore, the adjustable wiper 22 of the follow up potentiometer 21 is at the electrical center of its resistor 23 and is therefore at the same potential as the center tap 30 of secondary winding 24. Similarly the wiper 32 of the vertical gyro bank potentiometer 33 is at the electrical center of resistor 34 and the wiper 41 of the directional gyro potentiometer 40 is at the electrical center of resistor 42 at which time there is no difference of potential between wipers 32 and 41. Similarly, in the rudder section the follow up wiper 141 of potentiometer 140 is at the electrical center of resistor 142 and is therefore at the same potential as the center tap of secondary winding 143. Also the wiper 150 of the rudder centering potentiometer 149 and the wiper 155 of the rate gyro potentiometer 154 are at the same potential.

In the variable impedance network 61, the wiper 63 of the follow up potentiometer 62 is at the electrical center of resistor 64 and is therefore at the same potential as the center tap of secondary winding 65.

At this time, therefore, there is no input control signal applied to either the aileron amplifier 17, the rudder amplifier 135, the displacement motor amplifier 55, or the variable rate motor amplifier 82.

The aircraft will be assumed to be entering the localizer pattern from the right of the localizer beam and to be headed in a direction such as to intercept the beam as the aircraft approaches the airfield. The localizer receiver 110 will now transmit a voltage signal proportional to the angular displacement of the aircraft from the localizer beam which angle as now apparent is measured in a horizontal plane with the localizer transmitter as a reference point. This angular distance voltage signal is applied to the network 118. The network 118 will derive a voltage signal between adjustable tap 121 and the lower end of resistor 122 as shown which is proportional to the rate of change of the angular distance. Since the aircraft is approaching the beam the angular rate is a negative quantity and will be subtracted by the network from the voltage proportional to the angular distance. The voltage across tap 121 and terminal 124 is consequently the difference between the angular distance of the aircraft from the beam and the rate of change of the angular distance.

The combined rate and angular distance signal is applied to the converter 75 from which an A.C. voltage is applied across the voltage dividing potentiometers 69 and 88 proportional to the difference of the angular distance and the rate of change of angular distance of the craft from the localizer beam.

By means of potentiometer 69 and associated connections this alternating voltage is applied to the input circuit of amplifier 55 which operates and causes the displacement motor 48 to rotate. Motor 48 through its follow up connection 74 displaces the wiper 63 of the follow up potentiometer 62 until the voltage between the wiper 63 and the center tap of secondary winding 65 is equal and opposite to the voltage derived from the potentiometer 69. At this time the motor 48 ceases to rotate. In addition to driving the follow up wiper 63 the motor 48 drives one arm of differential 45 which causes the third arm of the differential to displace the wiper 41 of the localizer-directional gyro potentiometer.

The displacing of wiper 41 from the electrical center on resistor 42 results in a voltage being generated between wiper 41 and center tap 163 which is applied across the resistor 162 of the voltage dividing potentiometer 160. The voltage between wiper 161 and the lower end of resistor 162 is applied to the input circuit of rudder amplifier 135. The amplifier 135 causes the servomotor 134 to position the rudder to the right of its normal position. In addition, the servomotor 134 through the follow up connection 146 positions the wiper 141 with respect to resistor 142 thereby deriving an opposing signal to balance the control signal network of amplifier 135.

Displacing wiper 41 of potentiometer 40 also generates a signal between wiper 41 and the wiper 32 of the vertical gyro potentiometer 33 whereby the input circuit of aileron amplifier 15 becomes unbalanced.

The amplifier 15 operates and causes the aileron servomotor 14 to position the ailerons, the left aileron being lowered and the right aileron being raised. The aileron servomotor also operates the follow up connection 27 to displace wiper 22 of the follow up potentiometer 21 with respect to resistor 23 to rebalance the input circuit of aileron amplifier 15. Under the applied ailerons the aircraft banks toward the right.

The vertical gyro 38 senses the bank of the aircraft toward the right and through its operative connection 37 displaces the wiper 32 of the aileron banking potentiometer 33. Such operation of the wiper 32 causes the unbalance of the aileron amplifier input circuit whereupon the aileron amplifier 15 operates its servomotor 14 in the opposite direction from its initial operation whereby the ailerons are moved toward normal position.

In the meantime, the potentiometer 88 has applied a signal to the rate motor amplifier 82 to effect the operation thereof. The amplifier 82 in turn causes the rate motor 76 to rotate at a speed proportional to the signal derived from the potentiometer 88. The velocity generator 80 as it is driven by the rate motor 76 introduces a signal into the control input circuit of amplifier 82 which affects the operation of the amplifier 82 in such manner as to maintain the speed of the rate motor 76 proportional to the voltage derived from the potentiometer 88. In other words, the velocity generator 80 generates a voltage that subtracts from the voltage derived from the potentiometer 88. These two signals, the velocity signal and the signal from potentiometer 88 are added algebraically and applied to the input terminals 85, 86 of amplifier 82. When the speed of the rate motor 76 tends to increase beyond the preselected value the velocity signal from generator 80 decreases the total signal to amplifier 82 thereby reducing the speed of the rate motor 76 and thus tends to maintain the speed of motor 76 proportional to the signal derived from potentiometer 88.

The rate motor 76 drives through its shaft 81 one input arm of differential 49. As the aircraft at this time is also turning about the yaw axis, due to its banked position, the directional gyro 96 also operates an input arm of differential 49. If the rate of turn of the aircraft corresponds with the rate of turn of rate motor 76, the output shaft 46 of differential 49 will not rotate, therefore, the position of wiper 41 of potentiometer 40 is at this time not affected by the turning of the aircraft.

While the aircraft is turning about the yaw axis, the rate gyro 158 is precessed by the turning action and moves wiper 155 with respect to resistor 156 to derive a signal which causes movement of the rudder toward normal position.

As the aircraft approaches the localizer beam, the localizer signal derived from receiver 110 decreases. This decrease in the localizer receiver signal decreases the A.C. voltage across potentiometers 69, 88. The input circuit of amplifier 55 is again in an unbalanced condition but of opposite direction; consequently the amplifier 55 causes the displacement motor 48 to rotate in an opposite direction. The displacement motor 48 operates the follow up wiper 63 of potentiometer 62 to again balance the input circuit of amplifier 55. The displacement motor 48 through differential 45 also moves the wiper 41 of potentiometer 40 back toward its signal position.

The input circuit of amplifier 15 is thereby unbalanced from the movement of wiper 41, and the amplifier 15 causes the servomotor 14 to operate the ailerons whereby the left aileron is moved in the upward direction from normal position and the right aileron is moved toward a lower position from its normal position. The aileron servomotor 14 operates the follow up wiper 22 to balance the aileron amplifier input circuit.

The input circuit of amplifier 135 is also unbalanced resulting in the operation of rudder servomotor 134 to move the rudder toward the left from approximately its normal position and to operate the follow up wiper 141 to balance the input circuit of amplifier 135.

Due to the applied ailerons, the aircraft moves toward a level position from its right bank position. The vertical gyro 38 senses the decrease in bank and operates its wiper 32 to again unbalance the input circuit of aileron amplifier 15. Amplifier 15 operates the servomotor 14 which moves the ailerons back toward normal position and rebalances the input circuit by operating follow up wiper 22.

Due to the decrease in the amount of bank of the aircraft, the rate of turn of the aircraft decreases; consequently, the rate gyro 158 moves its wiper 155 in a direction to unbalance the input circuit of rudder amplifier 135. The amplifier 135 operates a servomotor 134 to move the rudder back toward normal position and to balance the input circuit of amplifier 135.

The decrease in the localizer signal across potentiometer 88 also causes the rate motor 76 to decrease in speed of rotation. If the rate of turn of rate motor 76 matches the decreased rate of turn of the aircraft, the output shaft 46 of differential 49 will not rotate and the position of wiper 41 of potentiometer 40 is again determined by the rotation of displacement motor 48. If the rates of turn of motor 76 and the craft are not the same, differential 49 will have its shaft 46 differentially driven. This movement is transmitted through differential 45 to potentiometer 40 to provide a signal to make the rate of turn of the craft conform to the rate of motor 76.

The potentiometers 69 and 88 have their wipers 71 and 89 adjusted so that equal signals are fed into the amplifiers 56 and 82. For some purposes it may be desirable to vary this one to one ratio of voltages by decreasing the value of the signal from potentiometer 88 relative to the voltage from potentiometer 69 so that the rate of turn of the steering motor is less than the rate of turn of the aircraft as resulting from the operation of the displacement motor 48.

The above described action is continuous in that as the aircraft approaches the beam resulting, in a decrease in the signal from localizer receiver 110 and the consequent reverse rotation of the displacement motor 48, it effects a movement of wiper 41 of the localizer-directional gyro potentiometer so that the input circuits of the aileron amplifier 15 and the rudder amplifier 135 are unbalanced to cause a decrease in the bank of the aircraft. The flight path of the aircraft ultimately blends into the localizer beam of the transmitter. At this point the localizer receiver signal reduces to zero and since the flight path follows the localizer beam, the rate signal from network 118 also is zero.

The aircraft is now stabilized on the localizer beam by the directional gyro 96. Should the aircraft tend to wander from the localizer beam, the directional gyro 96 will operate the wiper 41 of potentiometer 40 to unbalance the input circuits of the aileron and rudder amplifiers whereby the ailerons and rudder are positioned to return the craft to the direction of the localizer beam.

While the operation of the mechanism has been described when the aircraft was approaching the airfield and was also approaching the localizer beam from the right, it is believed that the operation will be apparent should the aircraft be to the right of the beam but departing from the beam. In this case the rate signal derived from network 118 is positive and is added to the displacement signal from the localizer 110 so that the craft initially turns to the left to bring it on a heading so that it approaches the beam and thereafter the aircraft will turn to the right to bring it on the localizer beam. Further, since the operation has been described when the aircraft is to the right of the beam, it is also apparent that the apparatus functions equally as well when the aircraft is to the left of the localizer beam; and also that the apparatus may be used when flying out on the beam as well as flying in therein.

It is now evident that I have provided a novel automatic steering mechanism responsive to radio signals for controlling the heading of an aircraft. The control of the heading of the aircraft may be utilized particularly to cause the aircraft to turn and follow a localizer beam. In my novel mechanism, furthermore, the time lag of response of the aircraft to turn signals applied to the steering mechanism in response to radio signals is minimized. The arrangement also functions as a form of reset in which a permanent change in operating condition is taken into consideration automatically. This condition may arise where the localizer beam is to be followed by an aircraft which is subject to a permanent action tending to force the craft off the beam such as a cross wind. This action may also be the result of an out-of-trim condition of the craft or other factors but the cross wind action is taken to illustrate the operation of the arrangement under such conditions. If the craft be on the beam, the wind continually tends to carry the craft off of the beam. It is therefore necessary to maintain the control surfaces displaced so the craft is headed upwind in order to stay on the beam. Thus, theoretically, the speed of the craft, relative to the air, across the beam is made equal and opposite to the speed of the wind and craft across the beam consequently the craft remains on the beam. This result is achieved by the output of motor 79 which continues to drive as long as the craft is off of the beam. The motor 79 does not reverse its rotation as does motor 48 as the localizer signal decreases when the craft approaches the beam, and its rotation displaces slider 41 to provide the necessary signal opposing that of the displaced control surfaces rebalancing potentiometers.

Although I have shown but one embodiment of my invention, various changes and modifications in the form and arrangement of the parts, which will now appear to those skilled in the art, may be made without departing from the scope of my invention. Reference is therefore to be made to the appended claims for a definition of the limits of my invention.

I therefore claim as my invention:

1. Control apparatus for a dirigible craft having a control surface for steering said craft, comprising: control surface power means; control means for reversibly actuating said power means including a signal generator; attitude means responsive to movement about an axis and adapted to operate said generator to provide a signal proportional to the magnitude of said movement; further means for operating said signal generator, said further means comprising a variable rate motor means and a displacement motor means; and means for energizing said displacement motor means dependent on the distance of said craft from a course and the displacement of said motor; and means for operating said variable rate motor means at a speed dependent on the distance of said craft from said source.

2. Control apparatus for a dirigible craft having a control surface for steering said craft, comprising: control surface power means; a control means for operating said power means including a balanceable electrical network; means for unbalancing said network in accordance with a function of the distance of said craft from an established ground line to set up a rate of turn of said craft and to bring said craft to said line; means driven by said power means to rebalance said network; a motor means displaced in accordance with an integral of the function of the distance; gyro means for maintaining the craft's heading in the direction of said line; means differentially operated by the motor means and said gyro and connected to said unbalancing means for additionally unbalancing said network to effect a change in heading to maintain said craft on said line.

3. Control apparatus for a dirigible craft having a control surface to steer said craft, comprising: control surface power means; a balanceable control means for effecting operation of said power means; means including a radio receiver for unbalancing said control means in accordance with the magnitude of the distance of said craft from an established ground line; follow-up means driven by said power means for rendering said control means inoperative without further change of magnitude of said distance; a directional gyroscope; motor means; means for operating said motor means at a rate varying with the distance; and further means in said control means connected to said motor means and said gyro whereby said further means is differentially responsive to the relative rate of turn of said craft and said motor means for additionally operating said control means.

4. In control apparatus for a dirigible craft having a control surface to steer said craft, comprising: control surface power means; control means for said power means comprising a balanceable electrical network; radio means for deriving a signal which is proportional to the distance of said craft from a datum line and a derivative of the distance; means controlled by said signal for unbalancing said network in proportion to the magnitude of said signal; motor means operated by said signal at a rate of movement which is a function of said distance and an extent dependent on the duration of the signal for also unbalancing said network; and gyro means responsive to change in craft heading for further unbalancing said network.

5. In control apparatus for a dirigible craft having a control surface to steer said craft, comprising: a localizer receiver for deriving a unidirectional voltage of reversible phase proportional to a function of the distance of said craft from a datum; means for converting said unidirectional voltage into an alternating voltage; a first motor means displaced in accordance with the magnitude of said alternating voltage which displacement is decreased as said distance decreases; a second motor means operated at a rate proportional to the magnitude of said alternating voltage and while said craft has any distance from said datum; a directional gyro; a control surface power means; a control means for said power means; and means for differentially controlling said control means from said first and second motor means and from said directional gyro.

6. In control apparatus for a dirigible craft; control surface power means; control means for said power means including an operation initiating controller; a differential; radio receiving means responsive to radio waves for providing a control effect which is a function of the distance of said craft from an equal intensity path formed by multiple waves; a first means controlled by said receiving means and displaced in proportion to the magnitude of the function of the distance for actuating a first arm of the differential; a second means operated at a rate proportional to said function and an extent dependent also on the duration of said control effect for actuating a second arm of said differential; and means including a directional gyro for actuating said controller from a third arm whereby said craft is caused to follow said path at a heading differentially determined by said second means and said gyro.

7. Control apparatus for a dirigible craft comprising: power means for controlling the direction of flight of the craft; control means for said power means comprising a balanceable electrical network; a motor; means for supplying to said motor a signal whose intensity varies with the magnitude of the displacement of said craft from an equal intensity path formed by two overlapping radio wave patterns; rebalancing signal means driven by said motor for limiting the motor rotation in accordance with the intensity signal; means driven by said motor means to unbalance said network and effect operation of said power means to steer said craft toward said path; a second motor; means for applying said intensity signal to said second motor; a generator driven by said second motor and opposing said intensity signal to limit the speed of the second motor in accordance with the magnitude of said intensity signal; a direction responsive device; means driven by said device for affecting the balance of said network to maintain the craft headed in the direction of said path; and means driven by said second motor for modifying the action of said device while said intensity signal is applied to said motor to provide a permanent change in the heading of said craft from said direction.

8. Control apparatus for steering a dirigible craft along a line defined by a radio transmitter, said apparatus comprising: means including a radio receiver for deriving a first signal proportional to the magnitude of the displacement of the craft from the line; a directional gyroscope; means driven by said gyroscope for producing a second signal in proportion to the change in heading of said craft from the direction of said line; means responsive to said first and second signals for operating a control surface for controlling the heading of said craft; and further means movable at a rate depending on the magnitude of said displacement from the line and an extent also dependent on the duration of said displacement; and connections from said further means to said responsive means, whereby said further means, in effect, aids said first signal in said responsive means to effect a permanent change in the heading of said craft when said craft is on said line, said change in heading offsetting the effects of cross winds tending to displace said craft from said line.

9. A navigating system for aircraft whereby the craft may be caused to approach and thereafter maintain a chosen course, said system comprising means for obtaining a signal proportional to the displacement of said craft from a chosen ground track reference, means for obtaining a signal varying with a time integral of said displacement signal, means for obtaining a craft velocity component signal proportional to a function of the angle between the direction of flight of said aircraft and the bearing of said ground track, means for obtaining a signal varying with the angle of bank of the craft, and means connected to receive said signals for supplying an output varying with the algebraic sum thereof.

10. A navigating system for aircraft whereby the craft may be caused to approach and thereafter maintain a chosen course, said system comprising means for obtaining a signal proportional to the displacement of said craft from a radio defined chosen ground track reference, means for obtaining a signal having a value dependent upon the direction of aircraft approach toward said ground track, means for obtaining a signal varying with the time integral of one of said above-mentioned signals, means for obtaining a signal varying with the angle of bank of the craft, and means connected to receive said signals for supplying an output varying with the algebraic sum thereof.

11. In a radio guided homing automatic pilot for aircraft whereby the craft may be caused to maintain a radio defined course, comprising means for obtaining a first signal proportional to the magnitude of the displacement of the craft from said radio course, means for providing a second signal having a value dependent upon the rate of craft approach toward said radio course, means for integrating at least a portion of said displacement signal with respect to time, means for producing a resultant signal proportional to the algebraic sum of said first and second signals corrected by the output of said integrating means, and servo means for controlling the ailerons of said craft governed by said resultant signal.

12. In a radio guided homing automatic pilot for aircraft whereby the craft may be caused to maintain a radio course, comprising means for obtaining a first signal proportional to the magnitude of displacement of the craft from said radio course, means providing a second signal having a value proportional to a linear velocity vector component determined by a mathematical function of the angle of craft approach toward said radio course, means for integrating at least a portion of said displacement signal with respect to time producing a third signal, means for producing a resultant signal proportional to the algebraic sum of said first, second and third signals, and servo means for controlling the ailerons of said craft governed by said resultant signal.

13. In a radio guided homing automatic pilot for aircraft whereby the craft may be caused to maintain a radio defined course, comprising means for obtaining a first signal proportional to the magnitude of displacement of the craft from said radio course, means providing a second signal having a value dependent upon the direction and velocity of craft approach toward said radio course, means for integrating at least a portion of said displacement signal with respect to time producing a third signal, means for producing a signal varying with the bank angle of the craft, means for producing a resultant signal proportional to the algebraic sum of all of said signals, and servo means for controlling the ailerons of said craft governed by said resultant signal.

14. The apparatus of claim 12; with means driven by said servomotor producing a fourth signal; and further means combining said fourth signal with said resultant signal.

15. The apparatus of claim 9, wherein the obtained signals are electrical signals and the means for obtaining a craft velocity component signal comprises a resistor-capacitor rate circuit.

16. A navigating system for aircraft in flight whereby the craft may be caused to approach and thereafter maintain a chosen course, said system comprising: means for obtaining a signal proportional to the displacement of said craft from a chosen ground track reference, means for obtaining a signal varying with the time integral of said displacement signal; means for obtaining a signal varying with the angle of bank of the craft, and means connected to receive said signals for supplying an output varying with the algebraic sum thereof.

17. Control apparatus for a dirigible craft having attitude changing means to steer said craft comprising: power means operating said attitude changing means; a balanceable control means effecting operation of said power means; means including a radio receiver unbalancing said control means in accordance with the magnitude of the distance of said craft from an established ground track; follow-up means driven by said power means rebalancing said control means; a craft heading responsive device; motor means; means operating said motor means at a rate proportional to the distance of said craft from the ground track; and further means in said control means operated by said motor means and heading responsive device whereby said further means is differentially responsive to the time integral of the distance and the change in heading of said craft for additionally operating said control means.

18. In control apparatus for a dirigible craft having attitude changing means to steer said craft, a first motor means displaced in accordance with the magnitude of the distance of said craft from a ground track; a second motor means operated at a rate proportional to the magnitude of the distance of said craft from said ground track; a craft heading responsive device; power means actuating said attitude changing means; a control means for said power means; and means controlling said control means from said first and second motor means and from said heading responsive device, for maintaining the craft on said ground track.

19. Control apparatus for a dirigible craft comprising: power means controlling the direction of flight of the craft; control means for said power means comprising a balanceable electrical network; a motor means; means for supplying to said motor means an electrical signal whose intensity varies with the magnitude of the displacement of said craft from an equal intensity path formed by two overlapping radio wave patterns; rebalancing electrical signal providing means driven by said motor for limiting the motor rotation in accordance with the intensity signal; means driven by said motor means to unbalance said network and effect operation of said power means to steer said craft toward said path; a second motor means; means for applying said intensity signal to said second motor means; an electrical signal generator driven by said second motor and opposing said intensity signal to limit the speed of the second motor means in accordance with the magnitude of said intensity signal; a direction responsive device; means driven by said device for affecting the balance of said network to maintain the craft headed in the direction of said path; and means driven by said second motor means for modifying the action of said device while said intensity signal is applied to said motor means to provide a permanent change in the heading of said craft from said direction.

20. The apparatus of claim 19; with said first and second motor means simultaneously responsive to said intensity signal.

21. In a navigation system for aircraft whereby the craft may be caused to maintain a chosen course, said system comprising: means for obtaining an electrical signal proportional to the displacement of said craft from a chosen ground track reference; means for obtaining a signal in accordance with a time integral of said displacement signal; means for obtaining a signal proportional to the rate of change of said displacement signal; means for obtaining a signal varying with the angle of bank of the craft; and means connected to receive said signals for supplying an output varying with the algebraic sum thereof.

22. In a navigating system for an aircraft whereby the craft may be caused to maintain a chosen course, said system comprising: means for obtaining a signal varying with the displacement of said craft from a chosen ground track reference and the rate of change of displacement thereof; means for obtaining a signal varying with a time integral of said displacement signal and rate signal combined; a craft heading responsive device providing a signal on change in craft heading; means for obtaining a signal varying with the angle of bank of the craft; and means connected to receive said signals for supplying an output varying with the algebraic sum thereof.

23. A navigating system for aircraft whereby the craft may be caused to approach and thereafter maintain a chosen course, said system comprising: means for obtaining a first signal proportional to the displacement and rate of displacement of said craft from a chosen ground track reference; means for obtaining a second signal varying with a time integral of said displacement signal; means for obtaining a third signal in response to change in craft heading; means for obtaining a fourth signal varying with the angle of bank of the craft; and means connected to receive said signals.

References Cited in the file of this patent

UNITED STATES PATENTS

| | | |
|---|---|---|
| 1,958,258 | Alexanderson | May 8, 1934 |
| 2,372,185 | Wittkuhns | Mar. 27, 1945 |
| 2,415,429 | Kellogg et al. | Feb. 11, 1947 |
| 2,423,336 | Moseley | July 1, 1947 |
| 2,496,809 | Moseley | Feb. 7, 1950 |
| 2,525,038 | Kutzler | Oct. 10, 1950 |
| 2,592,173 | Noxon et al. | Apr. 8, 1952 |